United States Patent [19]

Takubo

[11] Patent Number: 5,609,895
[45] Date of Patent: *Mar. 11, 1997

[54] METHOD FOR PRODUCING HALF-HULLED RICE MILK

[75] Inventor: Yoshiichi Takubo, Imabari, Japan

[73] Assignee: Takubo Kogyosho Co., Ltd., Ehime-ken, Japan

[*] Notice: The term of this patent shall not extend beyond the expiration date of Pat. No. 5,510,128.

[21] Appl. No.: 470,364

[22] Filed: Jun. 6, 1995

Related U.S. Application Data

[63] Continuation-in-part of Ser. No. 285,948, Aug. 4, 1994, Pat. No. 5,510,128.

[51] Int. Cl.$^6$ .................................................. A23L 1/10
[52] U.S. Cl. ........................... 426/28; 426/18; 426/29; 426/44; 426/49; 426/598; 426/629; 426/482
[58] Field of Search ........................... 426/7, 18, 28, 426/29, 31, 44, 49, 330, 590, 598, 615, 618, 629, 478, 481, 482, 484

[56] References Cited

U.S. PATENT DOCUMENTS

| | | | |
|---|---|---|---|
| 4,990,344 | 2/1991 | Euber et al. | 426/28 |
| 5,292,537 | 3/1994 | Hammond | 426/44 |
| 5,376,390 | 12/1994 | Hammond | 426/44 |

FOREIGN PATENT DOCUMENTS

| | | |
|---|---|---|
| 2-156864 | 6/1990 | Japan . |
| 2-38188 | 8/1990 | Japan . |
| 3-168054 | 7/1991 | Japan . |

OTHER PUBLICATIONS

Yatarou Nunokawa et al., Patent Abstract, 58–31996, Feb./1983.
Zenshi Yano, et al., Patent Abstract, 60–94082, May/1985.
Akio Sakamoto et al., Patent Abstract, 01–247067, Oct./1989.

*Primary Examiner*—Leslie Wong
*Attorney, Agent, or Firm*—Knobbe, Marten, Olson & Bear

[57] ABSTRACT

A process for producing half-hulled rice milk, comprising the steps of mixing malted rice, boiled half-hulled rice and hot water before or after saccharification of malted rice at 50° C.–65° C., and emulsifying and filtering the mixture to obtain an emulsified filtrate, whereby the half-hulled rice can be processed into a drink having a pleasant taste and texture without loss of nutrients.

14 Claims, No Drawings

METHOD FOR PRODUCING HALF-HULLED RICE MILK

The present application is a continuation-in-part of application Ser. No. 08/285,948, filed Aug. 4, 1994, now U.S. Pat. No. 5,510,128. The disclosure of this previous application is hereby incorporated herein in its entirety by this reference thereto.

BACKGROUND

1. Field of the Invention

This invention relates to a method for producing an emulsified filtrate of half-hulled rice (half-hulled rice milk), particularly to that for producing a nutritious emulsified drink made of half-hulled rice, which is easily digested and absorbed.

2. Background of the Art

Half-hulled rice contains abundant nutrients in embryo buds and other portions thereof and has been conventionally considered to be an excellent food product from the viewpoint of nutrition. However, the following problems are associated with half-hulled rice. Namely, since the skin of half-hulled rice is so hard and rigid that half-hulled rice cannot absorb water sufficiently, it is difficult to boil and soften half-hulled rice. Even if half-hulled rice is boiled with a pressure cooker, the skin of half-hulled rice remains so hard that half-hulled rice cannot be fully cooked. Thus, boiled half-hulled rice lacks a rich soft taste, in comparison with boiled polished rice. In addition, boiled half-hulled rice has a coarse texture and unpleasant taste, and cannot be thoroughly broken down, possibly resulting in indigestion. Therefore, it can cause gastroenteric trouble and an insufficient caloric intake. In order to solve these problems, "a process for producing processed half-hulled rice" has been disclosed in Japanese Patent Publication No. 2-38188. According to this process, the skin of half-hulled rice is cracked to improve water absorbability of half-hulled rice, whereby the half-hulled rice is allowed to be easily boiled through the cracked skin. However, this process was not sufficient to fully boil half-hulled rice, so the above problems remain unsolved.

SUMMARY OF THE INVENTION

The present invention has exploited a half-hulled rice milk. An objective of the present invention is to provide a method for refining half-hulled rice and improving the taste thereof.

Namely, one important aspect of the present invention is a method for producing a half-hulled rice milk, comprising the steps of: (a) preparing boiled (or steamed) half-hulled rice with water sufficient to make a gruel; (b) adding malted rice to said half-hulled rice gruel to obtain a mixed gruel of malted rice and half-hulled rice; (c) saccharifying the malted rice in said mixed gruel at 50° C. to 65° C.; (d) heating the resulting gruel to terminate saccharification and sterilize said gruel; (e) adjusting the water content of the resulting gruel before or after step (d); (f) emulsifying the heated gruel; and (g) filtering the emulsified gruel to obtain half-hulled rice milk. By using pre-cooked half-hulled rice with added water as the starting material, and by taking advantage of saccharifying effects of malted rice at a relatively high temperature, surprisingly, it is possible to refine half-hulled rice and improve the taste thereof, without any significant deterioration of nutrients, due to half-hulled rice being boiled without damaging the integrity of the grains.

In the above method, in step (b), the ratio of malted rice to the half-hulled rice used to make the gruel in step (a) is preferably 10%–50% by weight. Within this ratio, both nutrition and sensory values can be improved. The saccharification of the malted rice in step (c) is conducted preferably at 57.5° C. for seven to eight hours. Under the reaction conditions, saccharification can efficiently take place so as to improve taste. Further, by adding sodium bicarbonate (sodium hydrogencarbonate) to the half-hulled rice milk before or after emulsifying said heated gruel in step (f) to neutralize the pH of said gruel, taste can be moderated.

Another important aspect of the present invention is a method for producing a half-hulled rice milk, comprising the steps of: (a) mixing malted rice with water to obtain a suspension of malted rice and water; (b) saccharifying said malted rice in said suspension at 50° C. to 65° C.; (c) heating the resulting suspension containing saccharified malted rice to terminate saccharification and sterilize said slurry; (d) mixing the heated suspension with boiled half-hulled rice to obtain a mixed suspension of saccharified malted rice, boiled half-hulled rice and water; (e) emulsifying the resulting mixed suspension; and (f) removing residues from the emulsified suspension to obtain a half-hulled rice milk. When the half-hulled rice content is relatively low in the final product, such as a ratio of 20%–30% of the boiled half-hulled rice without water added in step (d) to the malted rice added in step (a), the above method effectively works. In the method, when the step of removing residue from the heated suspension between step (c) and step (d)is further conducted, sensory values of the final product can be improved. In the method, the ratio of malted rice to water in step (a)is preferably 25%–30% by weight, thereby efficiently performing saccharification.

As described in the aforesaid method, the saccharification of the malted rice in step (b) is preferably conducted at 57.5° C. for seven to eight hours, thereby enhancing saccharification effects. Further, when the step of adding sodium bicarbonate to the half-hulled rice milk before or after emulsifying said mixed suspension in step (e) is conducted to neutralize the pH of said suspension, sensory value of the final product can be improved.

DETAILED DESCRIPTION OF THE PREFERRED EMBODIMENTS

In the present method, half-hulled rice or unpolished rice can be processed into an emulsified drink, a half-hulled rice milk, which is easily drinkable and easily digested, whereby the resultant food product makes digestion and absorption easy, to enable a sufficient intake of the nutrition contained in half-hulled rice.

According to the present invention, in order to process half-hulled rice into an emulsified drink, half-hulled rice is first soaked in water and boiled to prepare boiled half-hulled rice. By boiling or steaming half-hulled rice with an appropriate amount of water, the rice can undergo swelling and gelatinization completely. A regular boiling means can be adapted, e.g., a rice cooker, a pressure cooker or a gruel cooker, as long as the means can cook the rice without damaging the integrity of the grains. When boiled, nutrients of half-hulled rice can be advantageously preserved as compared with milled rice (see Table 2 indicated later). For example, the iron content in raw half-hulled rice is 220% of that in raw milled rice while it is 500% when boiled. The moisture content of the boiled half-hulled rice is preferably about 60%–70% by weight. The use of boiled half-hulled rice permits easy refining. When the half-hulled rice content is relatively high (such as a ratio of half-hulled rice to malted rice of 2–10 by weight), boiled half-hulled rice and malted rice are mixed before saccharification of the malted rice. If the half-hulled rice content is too high relative to the malted rice content, sensory values such as taste and texture will deteriorate. When the half-hulled rice content is relatively low (such as a ratio of half-hulled rice to malted rice of approximately one tenth by weight), after saccharification of malted rice, the malted rice and half-hulled rice are mixed. If the half-hulled rice content is too low, nutrition values will suffer.

In the case of a high half-hulled rice content, first, a half-hulled rice gruel is prepared by either mixing pre-cooked half-hulled rice with water or boiling half-hulled rice with a copious amount of water. In the above, preferably, the water added to the pre-cooked half-hulled rice is boiled water cooled to 55° C., so that contamination can be avoided and the next step, saccharification, can be continuously conducted using residual heat. The water content of the gruel mainly depends on the intended use of the final product. Malted rice is then added to the mixture while maintaining the temperature, preferably 55° C. Malted rice can be any type which is available on the market. Saccharification can be conducted in a water bath controlled at a constant temperature of 50°–65° C., preferably 57.5° C., for approximately 7–8 hours. Keeping the mixture at this temperature results in conditions suitable for the promotion of saccharification of malted rice. The emulsion is sweetened by the saccharification of malted rice, which makes the emulsion easily drinkable. The mixture of boiled half-hulled rice, malted rice and hot water is then boiled for sterilization for normally 5 minutes, so that yeast and other germs are killed and further fermentation is prevented. As a result, the mixed solution can maintain sweetness and freshness. The mixed solution is then filtered through the wire mesh screen to obtain an emulsified filtrate which is free from the skin of the half-hulled rice and other solid residue, and which can be consumed as a drink. Before filtrating the mixture, the water content of the mixture is adjusted and the mixture is agitated for normally 2–4 minutes until the mixture is sufficiently emulsified.

Additionally, it is possible to produce a concentrated half-hulled rice milk to be diluted with water 1:2.

In the case of low half-hulled rice content, first, saccharification of malted rice is conducted before mixing it with pre-cooked half-hulled rice. The ratio of malted rice to water in this step is preferably 25–30% by weight, thereby efficiently conducting saccharification. After heating the saccharified malted rice (suspension), when the heated malted rice and boiled half-hulled rice are mixed, the ratio of pre-cooked half-hulled rice (without additional water) to the malted rice is preferably 20–30% by weight. Other aspects in the above case are substantially the same as in the aforesaid method.

In any case, the step of adding sodium bicarbonate to the half-hulled rice milk before or after emulsifying the mixed suspension is effective in neutralizing the pH of said suspension. Further, the final product, i.e., half-hulled rice milk can contain other soft drinks such as cow's milk and plum soda. The solid content in the half-hulled rice milk is normally 10–30% in view of sensory values and nutrition.

According to the present invention, cooked half-hulled rice, hot water and malted rice are mixed together to obtain an emulsified drink, in which the malted rice sweetens the resulting drink due to the saccharification of the malted rice, thereby obtaining an agreeable drink. Further, since the drink is emulsified, the drink is easy to digest and lightens the gastroenteric burden when the drink is ingested. Furthermore, the absorption of nutrition is speedy and satisfactory.

The nutrients contained in the half-hulled rice can be preserved, and approximately 40 of nutritious components can be absorbed efficiently with an absorption ratio of not less than 90%.

In particular, various kinds of vitamins are abundant in the half-hulled rice. Thus, since niacin, inositol, β-cysterol, γ-oryzanol, phytic acid, octacosanol or the like, as well as such vitamins as B1, B2, D, E, F can be preserved during the production process, the emulsified filtrate of half-hulled rice according to the present invention can be described as a natural food product having high nutritive value.

There is little difference in caloric value between half-hulled rice and milled rice. However, half-hulled rice contains more nutrients than milled rice does. In particular, iron, potassium and niacin levels in half-hulled rice can maintained after boiling, as compared with milled rice. Tables 1 and 2 show a comparison in components between half-hulled rice and milled rice.

TABLE 1

COMPARISON IN COMPONENTS BETWEEN MILLED RICE AND HALF-HULLED RICE

|  |  | Rice | | Boiled Rice | |
| --- | --- | --- | --- | --- | --- |
|  |  | Half-hulled | Milled | Half-hulled | Milled |
| Energy | kcal | 351 | 356 | 153.0 | 148.0 |
| Moisture | g | 15.5 | 15.5 | 63.0 | 65.0 |
| Protein | g | 7.4 | 6.8 | 3.3 | 2.6 |
| Lipid | g | 3.0 | 1.3 | 1.3 | 0.5 |
| Saccharinity (Carbohydrate) | g | 71.8 | 75.5 | 31.4 | 31.7 |
| Fiber (Carbohydrate) | g | 1.0 | 0.3 | 0.4 | 0.1 |
| Ash | g | 1.3 | 0.6 | 0.6 | 0.1 |
| Calcium | mg | 10.0 | 6.0 | 4.0 | 2.0 |
| Phosphorus | mg | 300.0 | 140.0 | 130.0 | 30.0 |
| Iron | mg | 1.1 | 0.5 | 0.5 | 0.1 |
| Sodium | mg | 2.0 | 2.0 | 2.0 | 2.0 |
| Potassium | mg | 250.0 | 110.0 | 110.0 | 27.0 |
| Vitamins |  |  |  |  |  |
| B1 | mg | 0.54 | 0.12 | 0.16 | 0.03 |
| B2 | mg | 0.06 | 0.03 | 0.02 | 0.01 |
| Niacin | mg | 4.5 | 1.4 | 1.6 | 0.3 |
| E |  | o |  | o |  |
| F |  | o |  | o |  |
| D |  | o |  | o |  |
| Inositol |  | o |  | o |  |
| β-cysterol |  | o |  | o |  |
| γ-oryzanol |  | o |  | o |  |
| Phytic acid |  | o |  | o |  |
| Octacosanol |  | o |  | o |  |

(Blank circle indicates that each component is contained.)

TABLE 2

NUTRIENT CONTENTS (%) IN HALF-HULLED RICE RELATIVE TO MILLED RICE

|  | Before Boiling | After Boiling |
| --- | --- | --- |
|  | % (half-hulled rice/milled rice) | |
| Moisture | 100 | 97 |
| Protein | 109 | 127 |
| Fiber | 333 | 400 |
| Calcium | 167 | 200 |

TABLE 2-continued

NUTRIENT CONTENTS (%) IN HALF-HULLED
RICE RELATIVE TO MILLED RICE

|  | Before Boiling | After Boiling |
|---|---|---|
|  | % (half-hulled rice/milled rice) | |
| Iron | 220 | 500 |
| Sodium | 100 | 100 |
| Potassium | 227 | 407 |
| Vitamins B1 | 450 | 533 |
| B2 | 200 | 200 |
| Niacin | 321 | 533 |

A variety of specific processing techniques and processes are appropriately adapted for the process of the present invention, and some examples are as follows:

EXAMPLE 1

600 g of malted rice and 2300 g of boiled water cooled to 55° C. were mixed together in a vessel, and kept warm for approximately 8 hours in a water bath controlled at a constant temperature of 57.5° C. to saccharify the malted rice. The mixture was boiled for 3 minutes for sterilization, and filtered through a wire mesh screen. Subsequently, the filtrate and 160 g of boiled half-hulled rice were mixed together, agitated for 2 minutes and filtered through a wire mesh screen to obtain 2100 g of an emulsified filtrate free of solid residue. A small quantity of sodium bicarbonate (2 g) was added to the filtrate to improve the taste of the resulting drink. The drink had a pleasant taste and texture.

EXAMPLE 2

450 g of half-hulled rice and 4500 g of water were mixed together, brought to boil and then cooked over a weak flame for 30 minutes in a gas rice cooker to obtain gruel-like boiled half-hulled rice, which was then cooled to 60° C. 67.5 g of malted rice and the gruel-like boiled half-hulled rice were mixed, and kept warm for 4 hours at 60° C. A large spoonful of sodium bicarbonate (3 g) was added, the mixture was boiled for 5 minutes, agitated, and filtered to obtain 4000 g of an emulsified filtrate. The filtrate was diluted with twice the amount of water to obtain a drink which had a pleasant taste and texture.

EXAMPLE 3

300 g of malted rice and 1150 g of boiled water cooled to 55° C. were mixed together in a vessel, kept warm at 57.5° C. for 8 hours for saccharification, then boiled for approximately 3 minutes for sterilization and filtered to obtain a sterilized filtrate. 80 g of boiled half-hulled rice (i.e., 30 g of raw half-hulled rice) and the filtrate were mixed together, agitated for 2 minutes and filtered to obtain 1000 g of an emulsified filtrate which was consumed as a drink. The drink had a pleasant taste and texture.

EXAMPLE 4

160 g of half-hulled rice was boiled in 270 g of water for 70 minutes according to a half-hulled rice cooking recipe from a rice cooker to obtain 400 g of cooked half-hulled rice, which was mixed in a vessel with 460 g of boiled water cooled to 55° C. The temperature of the mixture was held at 55° C., and 60 g of malted rice was added. The mixture was kept warm for approximately 7 hours in a water bath controlled at a constant temperature of 57.5° C. to saccharify the malted rice. Thereafter, 460 g of hot water was added and the mixture was boiled for 5 minutes for sterilization. 2 g of sodium bicarbonate was added, agitated for 4 minutes, and filtered through a wire mesh screen to obtain 1050 g of an emulsified filtrate which was consumed as a drink. The drink had a pleasant taste and texture. Further, 50 ml of plum syrup may be added to the filtrate to give it a tart taste.

EXAMPLE 5

160 g of half-hulled rice was boiled in 270 g of water for 70 minutes according to a half-hulled rice cooking recipe from a rice cooker to obtain 400 g of cooked half-hulled rice, which was mixed in a vessel with 460 g of boiled water cooled to 55° C. The temperature of the mixture was held at 55° C., and 60 g of malted rice was added. The mixture was kept warm for approximately 7 hours in a water bath controlled at a constant temperature of 57.5° C. to saccharify the malted rice. Thereafter, 690 g of boiling water was added to the mixture, and then boiled for 5 minutes for sterilization. 2 g of sodium bicarbonate was added, agitated for 4 minutes, and filtered through a wire mesh screen to obtain 1250 g of an emulsified filtrate, to which 125 ml of milk was added. The drink had a pleasant taste and texture.

We claim:

1. A method for producing a half-hulled rice milk having a solid content of 10% to 30%, comprising the steps of:

(a) preparing boiled half-hulled rice with water to make a gruel having a water content depending on the solid content of the half-hulled rice milk;

(b) adding malted rice to said half-hulled rice gruel to obtain a mixed gruel of malted rice and half-hulled rice;

(c) saccharifying the malted rice in said mixed gruel at 50° C. to 65° C.;

(d) heating the resulting gruel to terminate saccharification and sterilize said gruel;

(e) adjusting the water content of the resulting gruel before or after step (d);

(f) emulsifying the heated gruel; and (g) filtering the emulsified gruel to obtain a half-hulled rice milk.

2. The method for producing a half-hulled rice milk according to claim 1, wherein said boiled half-hulled rice in a gruel state in step (a) is obtained by mixing boiled half-hulled rice with water.

3. The method for producing a half-hulled rice milk according to claim 2, wherein said water is boiled water cooled to 55° C.

4. The method for producing a half-hulled rice milk according to claim 1, wherein said boiled half-hulled rice in a gruel state in step (a) is obtained by boiling half-hulled rice with water sufficient for producing a gruel state.

5. The method for producing a half-hulled rice milk according to claim 1, wherein, in step (b), the ratio of malted rice to the half-hulled rice used to make the gruel in step (a) is 10%–50% by weight.

6. The method for producing a half-hulled rice milk according to claim 1, wherein the saccharification of the malted rice in step (c) is conducted at 57.5° C. for seven to eight hours.

7. The method for producing a half-hulled rice milk according to claim 1, further comprising the step of adding sodium bicarbonate to the half-hulled rice milk before or after emulsifying said heated gruel in step (f) to neutralize the pH of said gruel.

8. A method for producing a half-hulled rice milk, comprising the steps of:

(a) mixing malted rice with water to obtain a suspension of malted rice and water;

(b) saccharifying said malted rice in said suspension at 50° C. to 65° C.;

(c) heating the resulting suspension containing saccharified malted rice to terminate saccharification and sterilize said slurry;

(d) mixing the heated suspension with boiled half-hulled rice to obtain a mixed suspension of saccharified malted rice, boiled half-hulled rice and water;

(e) emulsifying the resulting mixed suspension; and (f) removing residues from the emulsified suspension to obtain a half-hulled rice milk.

9. The method for producing a half-hulled rice milk according to claim 8, further comprising the step of removing residue from the heated suspension between step (c) and step (d).

10. The method for producing a half-hulled rice milk according to claim 8, wherein the ratio of malted rice to water in step (a) is 25%–30% by weight.

11. The method for producing a half-hulled rice milk according to claim 8, wherein the ratio of the boiled half-hulled rice without additional water in step (d) to the malted rice added in step (a) is 20%–30%.

12. The method for producing a half-hulled rice milk according to claim 8, wherein the water added in step (a) is boiled water cooled to 55° C.

13. The method for producing a half-hulled rice milk according to claim 8, wherein the saccharification of the malted rice in step (b) is conducted at 57.5° C. for seven to eight hours.

14. The method for producing a half-hulled rice milk according to claim 8, further comprising the step of adding sodium bicarbonate to the half-hulled rice milk before or after emulsifying said mixed suspension in step (e) to neutralize the pH of said suspension.

* * * * *